United States Patent
Bobbitt et al.

(10) Patent No.: US 10,275,608 B2
(45) Date of Patent: Apr. 30, 2019

(54) OBJECT-CENTRIC VIDEO REDACTION

(71) Applicant: International Business Machines Corporation, Armonk, NY (US)

(72) Inventors: Russell P Bobbitt, New York, NY (US); Curtis H Brobst, Elgin, MN (US); Rogerio S Feris, Hartford, CT (US); Yun Zhai, Pound Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 28 days.

(21) Appl. No.: 15/294,694

(22) Filed: Oct. 15, 2016

(65) Prior Publication Data

US 2018/0107830 A1    Apr. 19, 2018

(51) Int. Cl.
| | |
|---|---|
| G06F 21/00 | (2013.01) |
| G06F 21/62 | (2013.01) |
| G06F 3/0484 | (2013.01) |
| G11B 27/034 | (2006.01) |
| G06T 7/20 | (2017.01) |
| G06K 9/62 | (2006.01) |
| G06K 9/00 | (2006.01) |

(52) U.S. Cl.
CPC ...... *G06F 21/6209* (2013.01); *G06F 3/04842* (2013.01); *G06F 3/04845* (2013.01); *G06K 9/00718* (2013.01); *G06K 9/621* (2013.01); *G06K 9/6254* (2013.01); *G06T 7/20* (2013.01); *G11B 27/034* (2013.01); *G06T 2207/30241* (2013.01)

(58) Field of Classification Search
CPC ............. G06F 21/6209; G06F 3/04845; G06F 3/04842; G06T 7/20; G06T 2207/30241; G06K 9/3241; G11B 27/034

See application file for complete search history.

(56) References Cited

U.S. PATENT DOCUMENTS

| | | | |
|---|---|---|---|
| 8,599,266 B2 | 12/2013 | Trivedi et al. | |
| 9,729,834 B2 * | 8/2017 | Desimone | G06K 9/00335 |
| 2010/0238285 A1 * | 9/2010 | Desimone | G06K 9/00335 |
| | | | 348/143 |
| 2012/0197439 A1 * | 8/2012 | Wang | B25J 9/1689 |
| | | | 700/259 |

(Continued)

FOREIGN PATENT DOCUMENTS

WO    201356187    4/2013

OTHER PUBLICATIONS

Atlassian, "Explore Apps for Atlassian Products," Atlassian Marketplace, p. 1-4, https://marketplace.atlassian.com/, Accessed on Apr. 5, 2018.

(Continued)

*Primary Examiner* — John B King
(74) *Attorney, Agent, or Firm* — Robert C. Bunker

(57) ABSTRACT

Techniques are described for video redaction. In one aspect, techniques include receiving a video for redaction; analyzing the video to generate an appearance model for the video, providing a user interface (UI) allowing a user to modify the appearance model, and responsive to a user selecting an object from the appearance model, extending and completing a trajectory of the selected object with enhanced marking based on the user input.

17 Claims, 3 Drawing Sheets

(56) References Cited

U.S. PATENT DOCUMENTS

| | | | |
|---|---|---|---|
| 2014/0115477 A1* | 4/2014 | Pendergast | G06F 3/04842 715/723 |
| 2015/0058232 A1 | 2/2015 | Persinger et al. | |
| 2015/0242104 A1* | 8/2015 | Stokman | G06F 3/04845 715/723 |
| 2015/0286719 A1 | 10/2015 | Sampathkumaran | |
| 2015/0286779 A1* | 10/2015 | Bala | H04N 19/46 386/283 |
| 2018/0137892 A1* | 5/2018 | Ding | G06K 9/00744 |

OTHER PUBLICATIONS

MotionDSP, "Video Enhancement, Readaction and 2-D Mapping Software," MotionDSP Home, p. 1-2, https://www.motiondsp.com/, Accessed on Apr. 5, 2018.

RapidRedact, "Redaction Software for all Redaction Requirements," RapidRedact: Fast Efficient Redaction Software, p. 1-2, http://www.rapidredact.com/, Accessed on Apr. 5, 2018.

VIEVU, "VIEVU: About Us," VIEVU: A Brand of the Safariland Group, p. 1-3, http://www.vievu.com/about-us/, Accessed on Apr. 9, 2018.

VIEVU, "Automated Video Redaction (AVR)," YouTube, p. 1, https://www.youtube.com/watch?v=Pi669Vw2swo&feature=player_embedded, Accessed on Apr. 5, 2018.

* cited by examiner

OBJECT-CENTRIC VIDEO REDACTION

TECHNICAL FIELD

The invention relates to systems and software for video redaction.

BACKGROUND

Video footage grows exponentially given the advancement in sensor technology. Law enforcement agencies across the nation are now more and more equipped with body cameras—a tremendous data source addition to the existing in-vehicle dash cameras. Due to the Freedom of Information Act requests continue to climb as public demands more and more transparency from law enforcement. There is an imminent need for the authority to rapidly redact video footage before releasing them to the public for privacy protection.

There are many redaction solutions in the market for static media such as images and documents. Image/document redaction techniques are not applicable due to the large volume and the highly dynamic content of videos. Based on the same argument, manual redaction is just not feasible for videos—e.g., a 5-minute video with 30 fps has 9000 frames. Recently due to the rapid spread of body worn camera usage, it has been proposed to use visual tracking technologies for redaction.

SUMMARY

In general, examples disclosed herein are directed to techniques for video redaction. In one aspect, techniques include receiving a video for redaction; analyzing the video to generate an appearance model for the video, providing a user interface (UI) allowing a user to modify the appearance model, and responsive to a user selecting an object from the appearance model, extending and completing a trajectory of the selected object with enhanced marking based on the user input.

In another aspect, a computer system for video redaction includes one or more processors, one or more computer-readable memories, and one or more computer-readable, tangible storage devices. Program instructions are stored on at least one of the one or more storage devices for execution by at least one of the one or more processors via at least one of the one or more memories, to perform operations comprising: receiving a video for redaction; analyzing the video to generate an appearance model for the video, providing a user interface (UI) allowing a user to modify the appearance model, and responsive to a user selecting an object from the appearance model, extending and completing a trajectory of the selected object with enhanced marking based on the user input.

In another example, a computer program product for video redaction includes a computer-readable storage medium has program code embodied therewith. The program code is executable by a computing device to perform operations comprising: receiving a video for redaction; analyzing the video to generate an appearance model for the video, providing a user interface (UI) allowing a user to modify the appearance model, and responsive to a user selecting an object from the appearance model, extending and completing a trajectory of the selected object with enhanced marking based on the user input.

DETAILED DESCRIPTION

Various examples are disclosed herein for video redaction. Mostly redaction is done at the "object/region" level to either (1) mask a particular target or (2) high-light it (reverse redaction). Therefore, masking the entire video is not desired. And for privacy protection, the target subject(s) must be fully redacted.

Manual redaction is not feasible due to fast growing demand and limited law enforcement resources. Some vendors try to attempt this problem using tracking technology. Although it's an appealing argument that tracking can provide fully automated solution, the state-of-the-art technology is just not good enough for the job—often the starting and/or the ending portion of the object's appearance is missed. More critically, due to the extreme dynamic content of body camera videos, tracking methods often fail to cover the target either (1) temporally—that some portion of the target in the middle of its appearance is missed due to broken tracks, and/or (2) spatially—the tracking areas are off from the actual object's position in video images so the target's identity is revealed.

In one aspect, the system described herein provide an interactive method to fulfill the requirements, while at the same time managing the labor cost to an acceptable level. The system takes both initial video analytics results and operator input, and learns the appearance model of the target to be redacted. Based on the learned information, the system automatically fills in the redaction between the initial redaction marks.

The system utilizes video analytics metadata providing an initial set of extracted objects and their trajectories—(a trajectory contains the spatiotemporal observations of the object in the video frames, including information such as time stamps, frame number, centroid, bounding boxes, and any applicable features).

Figure 1:
FIG. 1 is a screen shot illustrating a system for video redaction.

As illustrated in FIG. 1A, the redaction system at its launch time loads the video(s) and corresponding video analytics metadata. An administrator examines the quality of the video analytics metadata, and manually adjusts all or a subset of the marks. The system takes in the adjusted metadata, and builds an appearance model for the object using the metadata and associated visual information (e.g., color, face, skintone, facial attributes, movement, etc). In this process, there are a couple options (a) only considering the manually adjusted marks as the positive learning samples; or (2) applying weights to all marks for building the appearance model, but giving the adjusted marks higher weights.

Tracking algorithms often do not pick up the entire trajectory of the target object. This is true for all tracking algorithms—there's a first detection, and then tracking can be performed. The detection is bounded by the conditions so it does not always cover the edge cases—e.g., only a small portion of the object is seen when it firstly appears in the video. In this case, the redaction system automatically extends the trajectory from the original video analytics metadata to cover both front and trailing part of the object's appearance. This is done by utilizing the target appearance model and performing tracking (either forward or backward) on the object.

To handle the imperfect video analytics metadata, the system also refines the redaction marks by applying the appearance model on the existing marks -adjusting bounding box size and/or location. This can be done by methods like interpolation, visual tracking, region growing, etc.

Video analytics can only support a finite number of pre-defined object types, such as individual persons, faces, group of people, vehicles, etc. Being able to redact an object with un-defined type (or an arbitrary region) is critical to law enforcement agencies. To address this, our system allows operator to mark an arbitrary region a video frame, and automatically completes the redaction following the same methodology explained above.

The system learns the object's model from the manually marked samples. And applies that to establishing object locations in between manual marks. One embodiment of this process is (a) the initial bounding boxes are interpolated from the enclosing manual marks; (b) object model is applied to adjust the auto-mark's location and dimension so the object can be fully enclosed; (c) operator can examine the quality of the auto-marks, and makes adjustments if applicable; (d) system iterates the process to reach a final set of redaction marks.

System applies the same step to cover the front and trailing part of the redacted object. Manual interaction is integrated into the object's model construction, which is more reliable than video analytics output. Therefore the redaction quality is much better than the prior arts that use simple tracking methods. At the same time, since only a small number of manual adjustments are needed, the work load is manageable to the operators.

In one example, suppose the video images show a painting on the wall that is present from frame number 216 to frame number 234. In this case, total frames that need to be redacted are 234−216+1=19. Through using the above-described techniques, this eliminates the need to redact the painting in every of these 19 frames. Instead, the user can mark 3 samples, say, at frames 216, 223 and 234. Then the automatically figures out the markings for the same painting in the rest of frames.

Figure 2:
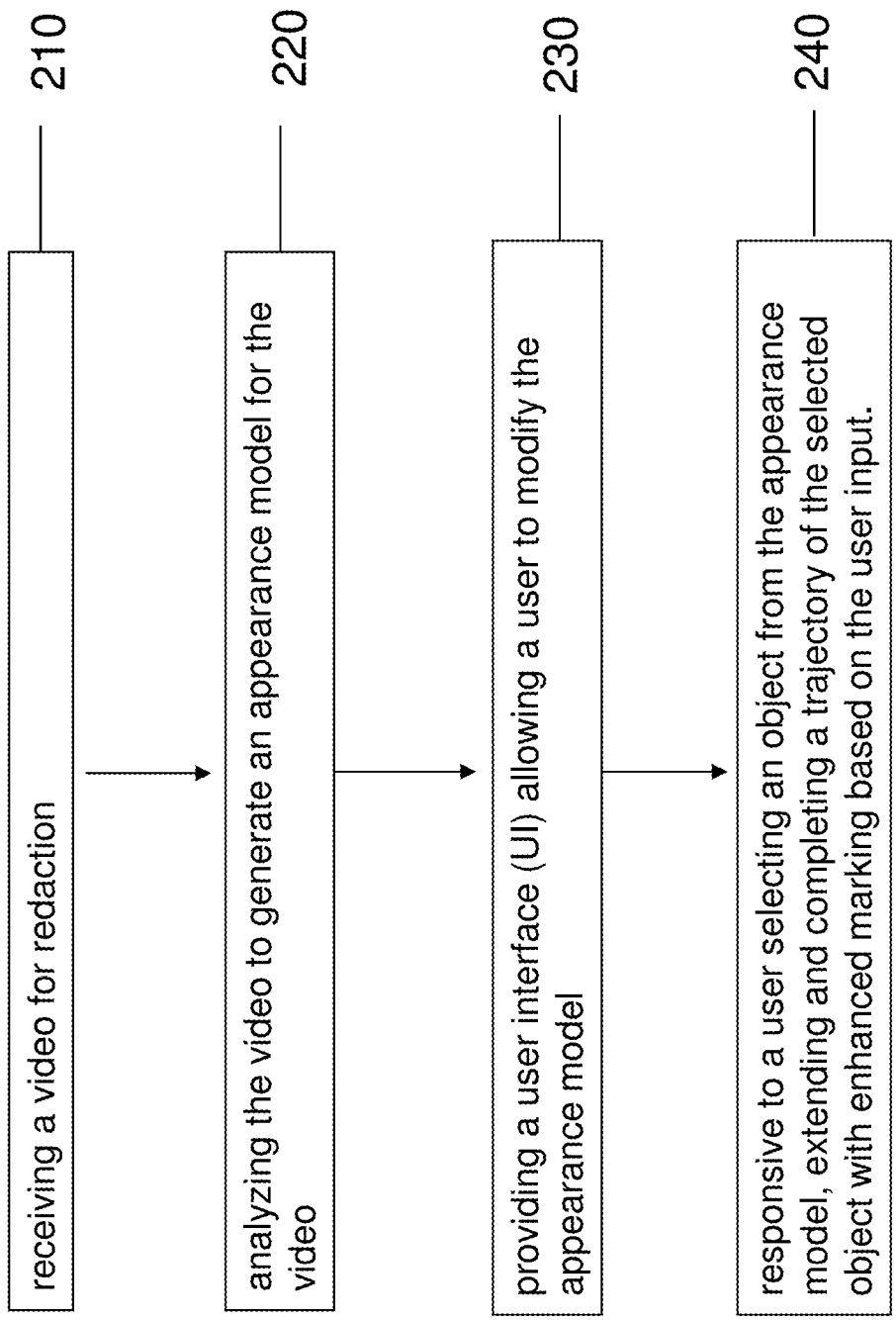
FIG. 2 is a flow diagram illustrating a method for video redaction

In one aspect, as shown in FIG. 2, techniques include receiving a video for redaction (step 210); analyzing the video to generate an appearance model for the video (step 220), providing a user interface (UI) allowing a user to modify the appearance model (step 230), and responsive to a user selecting an object from the appearance model, extending and completing a trajectory of the selected object with enhanced marking based on the user input. (step 240).

Figure 3:
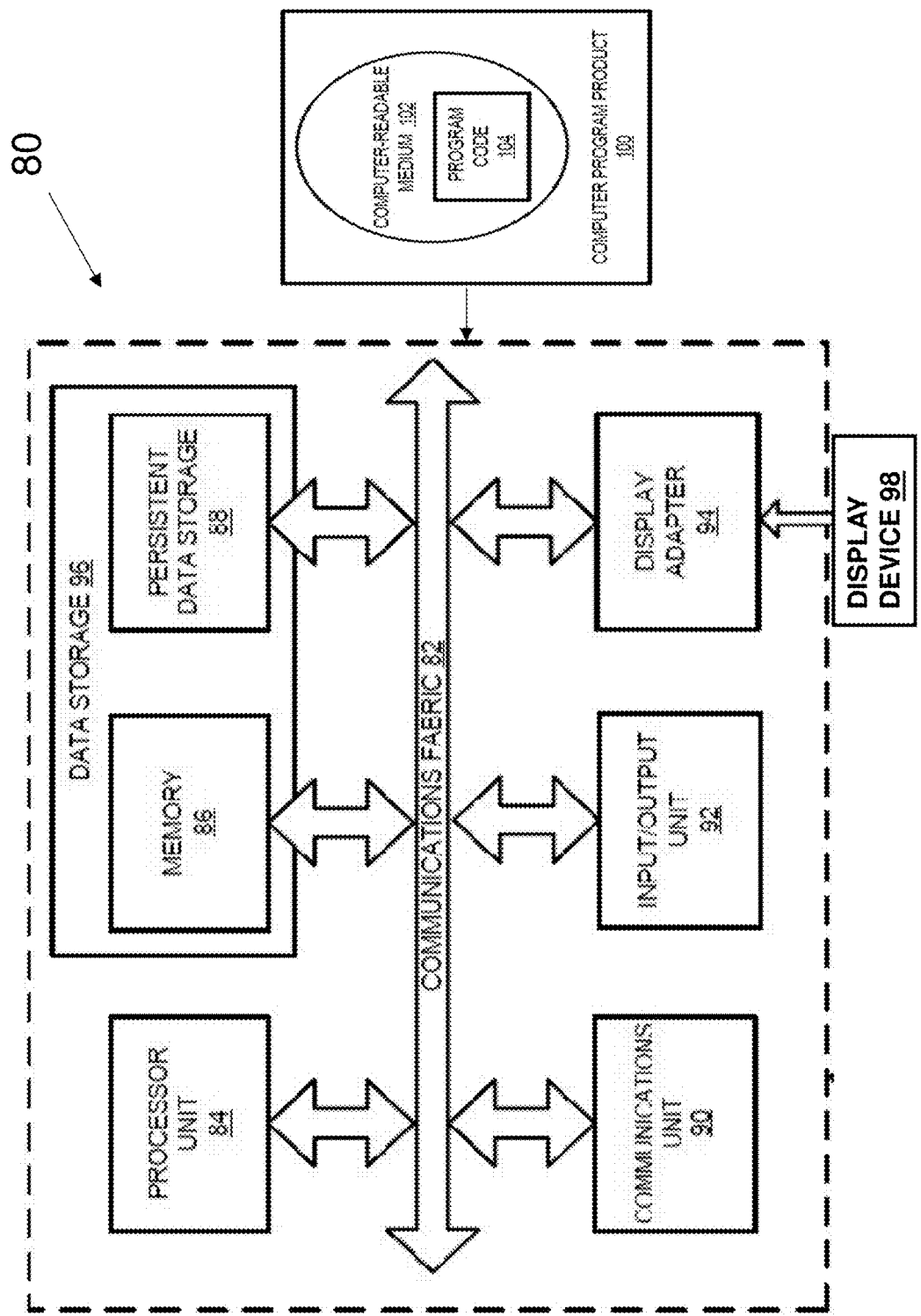
FIG. 3 is a block diagram of a computing device for video redaction.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless AN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention.

It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for video redaction, the method comprising:
    receiving a video for redaction having a plurality of frames;
    analyzing the video to generate an appearance model for the video;
    providing a user interface (UI) allowing a user to modify the appearance model with a plurality of user-placed marks;

receiving the plurality of user-placed marks corresponding with a plurality of sample frames selected from the plurality of frames;

interpolating a bounding box on the plurality of sample frames based on the received plurality of user-placed marks;

responsive to a user selecting an object from the appearance model based on the interpolated bounding box, extending and completing a trajectory of the selected object within a plurality of remainder frames from the plurality of frames, and placing automatically generated marks to enclose the selected object within each remainder frame of the plurality of remainder frames based on the received plurality of user-placed marks and the extended and completed trajectory of the selected object; and redacting the plurality of frames of the video based on the modified appearance model.

2. The method of claim 1, further comprising:
designating weightings for trajectory observations in the appearance model.

3. The method of claim 2, further comprising:
designating a higher weighting for the trajectory observations of the selected object than the weighting for observations that have not been selected.

4. The method of claim 1, further comprising:
receiving user input selecting a boundary for identify an object in the appearance model.

5. The method of claim 1, further comprising:
receiving further user input and making further modifications to the appearance model iteratively.

6. The method of claim 1, wherein the video is a video used for law enforcement.

7. A computer system comprising:
one or more processors, one or more computer-readable memories, and one or more computer-readable, tangible storage devices;

program instructions, stored on at least one of the one or more storage devices for execution by at least one of the one or more processors via at least one of the one or more memories to perform operations comprising:

receiving a video for redaction having a plurality of frames;

analyzing the video to generate an appearance model for the video;

providing a user interface (UI) allowing a user to modify the appearance model with a plurality of user-placed marks;

receiving the plurality of user-placed marks corresponding with a plurality of sample frames selected from the plurality of frames;

interpolating a bounding box on the plurality of sample frames based on the received plurality of user-placed marks;

responsive to a user selecting an object from the appearance model based on the interpolated bounding box, extending and completing a trajectory of the selected object within a plurality of remainder frames from the plurality of frames, and placing automatically generated marks to enclose the selected object within each remainder frame of the plurality of remainder frames based on the received plurality of user-placed marks and the extended and completed trajectory of the selected object; and redacting the plurality of frames of the video based on the modified appearance model.

8. The system of claim 7, wherein the operations further comprise:
designating weightings for trajectory observations in the appearance model.

9. The system of claim 8, wherein the operations further comprise:
designating a higher weighting for the trajectory observations of the selected object than the weighting for observations that have not been selected.

10. The system of claim 7, wherein the operations further comprise:
receiving user input selecting a boundary for identify an object in the appearance model.

11. The system of claim 7, wherein the operations further comprise:
receiving further user input and making further modifications to the appearance model iteratively.

12. A computer program product comprising a non-transitory computer-readable storage medium having program code embodied therewith, the program code executable by a computing device to perform operations comprising:

receiving a video for redaction having a plurality of frames;

analyzing the video to generate an appearance model for the video;

providing a user interface (UI) allowing a user to modify the appearance model with a plurality of user-placed marks;

receiving the plurality of user-placed marks corresponding with a plurality of sample frames selected from the plurality of frames;

interpolating a bounding box on the plurality of sample frames based on the received plurality of user-placed marks;

responsive to a user selecting an object from the appearance model based on the interpolated bounding box, extending and completing a trajectory of the selected object within a plurality of remainder frames from the plurality of frames, and placing automatically generated marks to enclose the selected object within each remainder frame of the plurality of remainder frames based on the received plurality of user-placed marks and the extended and completed trajectory of the selected object; and redacting the plurality of frames of the video based on the modified appearance model.

13. The program product of claim 12, wherein the operations further comprise:
designating weightings for trajectory observations in the appearance model.

14. The program product of claim 13, wherein the operations further comprise:
designating a higher weighting for the trajectory observations of the selected object than the weighting for observations that have not been selected.

15. The program product of claim 12, wherein the operations further comprise:
receiving user input selecting a boundary for identify an object in the appearance model.

16. The program product of claim 12, wherein the operations further comprise:
receiving further user input and making further modifications to the appearance model iteratively.

17. The program product of claim 12, wherein the video is a video used for law enforcement.

* * * * *